United States Patent [19]

Bruce et al.

[11] 4,176,052
[45] Nov. 27, 1979

[54] APPARATUS AND METHOD FOR CONTROLLING THE RATE OF FEEDING A PETROLEUM PRODUCT TO A COKING DRUM SYSTEM

[75] Inventors: Charles R. Bruce, Littleton; Irvin D. Johnson, Englewood, both of Colo.; Lawrence H. McGrievy, Robinson, Ill.

[73] Assignee: Marathon Oil Company, Findlay, Ohio

[21] Appl. No.: 954,941

[22] Filed: Oct. 13, 1978

[51] Int. Cl.² ............................ C10G 9/5; G06G 7/58
[52] U.S. Cl. .................................. 208/131; 202/121; 208/DIG. 1; 364/116; 364/500
[58] Field of Search .................. 202/121; 208/46, 106, 208/131, DIG. 1; 364/105, 116, 500

[56] References Cited

U.S. PATENT DOCUMENTS

| | | | |
|---|---|---|---|
| 2,929,765 | 3/1960 | Hengstebeck | 208/131 |
| 3,194,753 | 7/1965 | Winter | 208/131 |
| 3,295,902 | 6/1966 | Porter | 137/93 |
| 3,458,691 | 7/1969 | Boyd | 208/138 |
| 3,463,725 | 8/1969 | MacFarlane et al. | 208/358 |
| 3,936,358 | 2/1976 | Little | 208/131 |

*Primary Examiner*—Herbert Levine
*Attorney, Agent, or Firm*—Joseph C. Herring; Jack L. Hummel

[57] ABSTRACT

A coking drum system is provided in combination with a process control unit wherein the rate of material delivered to a coking drum during a coking process timing cycle is monitored and the quantity of material received by the coking drum is continuously derived therefrom. Based on this derived quantity of delivered material, the quantity of feed material required to fill the drum to a preestablished level with coke, at the completion of the timing cycle, can be predicted. The flow rate of feed material to the coking drum is accordingly adjusted so that the amount of coke produced in the drum during one timing cycle is optimized.

13 Claims, 12 Drawing Figures

APPARATUS AND METHOD FOR CONTROLLING THE RATE OF FEEDING A PETROLEUM PRODUCT TO A COKING DRUM SYSTEM

DESCRIPTION

1. Technical Field

This invention relates to processes which produce coke from a heavy petroleum fraction and more particularly to a coking drum system and apparatus which continuously and automatically determines the quantity of heavy petroleum fraction required to be delivered to a coking drum so that it is optimally filled with coke at the completion of the coking cycle and, a method of predicting the rate of feeding the heavy petroleum fraction to the coking drum so that the drum is optimally filled.

2. Background Art

The process of producing a coke product from a heavy petroleum hydrocarbon such as tar, asphalt, or the like, is well known in the art. Generally, a heavy petroleum hydrocarbon product, with a relatively greater concentration of carbon than hydrogen, is heated to a suitable temperature and fed into a coking drum where a coke product eventually forms. The substantially solid coke is subsequently cooled and mechanically removed from the coking drum.

In U.S. Pat. No. 2,929,765 to Hengstebeck, a coking vessel used in the liquid phase coking of heavy hydrocarbon oils is disclosed. In U.S. Pat. No. 3,194,753 to Winter an apparatus and method for producing coke continuously is described. U.S. Pat. No. 3,936,358 to Little teaches a method of optimizing the cooling of the coke prior to its removal from the coking drum.

However, these references and known coking apparatuses do not address nor solve the problem described herebelow. Heretofore, the usual method of controlling the feeding of material to a coking drum was performed manually by an operator. The operator would estimate the amount of feed material required to fill the drum with coke at the end of a coking cycle. The feed rate into the drum would then be adjusted accordingly. But accurately estimating the proper flow rate into the drum by the operator is extremely difficult because the operator has no convenient or practical way of determining where the coke level is in the drum at any particular point in time. Visual inspection is not possible since the coking drum must be made of a heavy, thick material capable of withstanding high temperatures. In addition, the coke-producing characteristics of the different petroleum products that are fed into the drum vary considerably depending on a number of factors including the types of petroleum products from which they are derived. Because of the wide variation in the coke-producing characteristics of the feed stocks, the amount of coke that can be produced from a given amount of petroleum usually varies for each coking cycle. Thus, this manual technique is often times inaccurate and results in undesirable and wasteful production of coke since the operator would often estimate that the feed rate was too high and would decrease the rate of feeding material into the drum. Consequently, at the end of the timing cycle the drum would not be filled to the desired capacity. Since the coking cycle consumes a considerable amount of time, approximately 22 to 24 hours, there would be a loss of coke production for that particular timing cycle. It can be appreciated that losses of coke production could have a substantial cumulative effect over a long period of time and, therefore, the need for increased coke production has made manual control of the feed rate an unsatisfactory procedure.

Similarly, the operator would occasionally estimate that the feed rate was too low and, therefore, would incorrectly increase the rate of feeding the material into the drum. This error often resulted in a viscous coke foam, which is also formed in the coking drum, being carried from the drum to vapor lines connected to the top portion of the drum and subsequently to a fractionater which separates the heavier petroleum product from the lighter petroleum product. This unwanted occurrence neccessitated unscheduled shutdowns for equipment clean out. Thus, this invention provides an apparatus and a method for automatically predicting and controlling the rate of feeding a heavy petroleum product into a coking system so that the coking drum is filled to a desirable predetermined level. Consequently, the amount of coke that can be produced therefrom is optimized for each coking cycle.

DISCLOSURE OF INVENTION

In accordance with this invention, a feed stock or material is delivered at a controlled rate to a fractionation structure which separates the heavier material from the lighter material. The heavier material subsequently moves to a heater which raises the material to a desired temperature. The heated material is then transferred to a drum in which a coke product forms. When the coke formed in the drum reaches a predetermined drum level, a signal results indicating that this level has been reached. This signal is then received by a process control unit and triggers therein the predicting of a new rate of feeding material. This new predicted feed rate is sent back to control the rate of feed stock inputted to the fractionation structure so that the coking drum is filled to capacity at the completion of a preselected coking cycle.

More particularly, a heavy petroleum product or charge having a relatively greater concentration of carbon than hydrogen, is delivered at a preselected rate through a flow rate monitoring meter into a fractionation tower which separates a heavier petroleum product such as tar or asphalt from a lighter petroleum distillate. The heavier petroleum product continues to a charge heater where it is raised to a suitabletemperature. A thermocouple device monitors the temperature of the heavy petroleum at a point prior to its entry into a first coking drum. Upon sensing that the heavy petroleum has reached a predetermined temperature, a process control unit records the time of day that charge began for the first coking drum. This process control unit includes an internal clock counter. Once this counter reaches a count corresponding to sixty seconds, the program-controlled processor integrates the flow rate of petroleum to determine the volume amount of petroleum so far delivered to the coking drum. The processor was previously provided with binary information corresponding to the total coking cycle time. A measured quantity of petroleum delivered to a preestablished reference level was previously recorded by the processor during a prior coking cycle. If the previous coking cycle was not monitored and controlled by the processing unit then the binary information represents a predicted quantity of petroleum delivered to the preestablished reference level. This prediction is based on results of previous coking cycles. The reference level is also defined in terms of the percentage of the coking drum filled at that level. The processor also determines the elapsed time since the beginning of the coking cycle. Based on this information, the processor then predicts the petroleum feed rate required to optimally fill the drum with coke in the time remaining in the coking cycle. This integration and calculation process continues at sixty second intervals.

The coking drum continues to fill with coke. Eventually, when the coke reaches the preestablished level in the drum, a radioactive source provides an indication that this level has been reached and triggers a switch which sends a reference signal to the control process unit. Upon receiving this reference signal, the control unit adjusts the binary data representing the total integrated flow rate at the reference level during this particular coking cycle. Since the reference level is a constant percentage of the coking drum volume and insofar as the processing unit keeps track of the remaining time left in the coking cycle, a new petroleum flow or charge rate can be predicted by the processor. Subsequently, a signal representing this predicted petroleum feed rate is fed back to adjust the rate of petroleum being inputted to the fractionation tower to coincide with this predicted rate.

At the completion of the preselected coke timing cycle and based on the predicted flow rate, the processing unit provides a signal which activates an alarm indicating that the drum is filled to capacity. The flow of the heavy petroleum product to the first coking drum is then stopped. The petroleum product may then be diverted to another or second coking drum. While the coke formed in the first drum is being mechanically removed, the process described above begins again utilizing the second coking drum.

In addition to a central processor, the process control unit includes a read out display capable of indicating particular input and output data upon manual selection of these parameters through a channel select switch. The activation of a particular channel select switch also permits entry of data, set in an input data switch, to a corresponding channel storage location when an enable input data switch is also activated.

The process control unit further includes a power supply which receives primary power from a conventional 110 VAC source to produce regulated DC voltages which are provided for the solid state circuits of the process control unit.

Accordingly, the process control unit of this invention in combination with a conventional double drum coking system significantly optimizes the production of coke in each of the drums since the appropriate coking process variables are continuously and automatically monitored and controlled. Furthermore, operator intervention is minimized so that unscheduled shut downs of the coking process due to operator error are also diminished. Additional advantages and novel features of this invention will become apparent from the description which follows, taken in conjunction with the accompanying drawings.

BEST MODE FOR CARRYING OUT THE INVENTION

Figure 1:
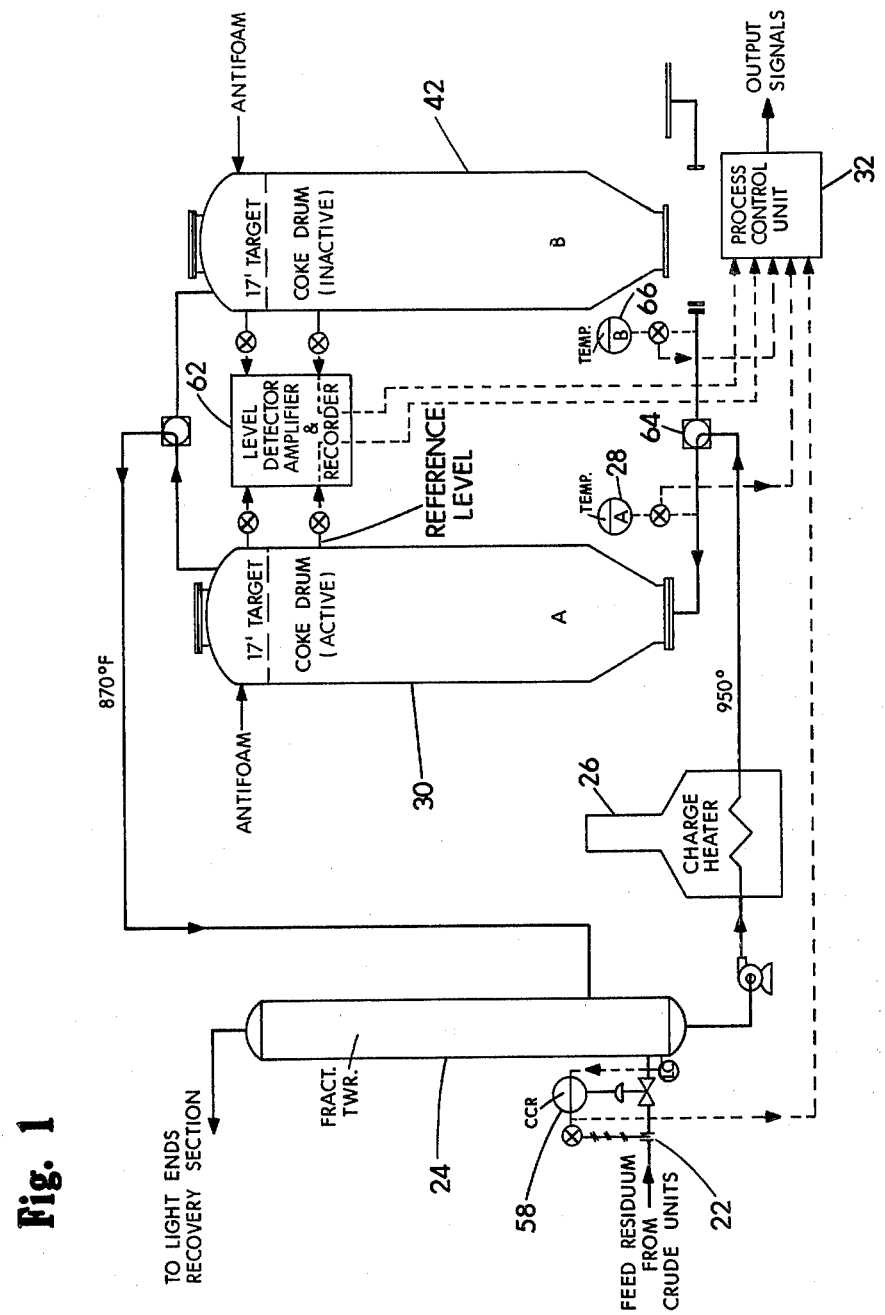
FIG. 1 is a diagrammatical view of the coking system and process control unit in accordance with this invention.

Referring to the drawings, FIG. 1 illustrates a feed residuum or stock being delivered through a flow meter 22 which is a conventional device for measuring the rate of flow or charge of a substance as it moves thereby. The feed residuum is preferably a heavy petroleum product having a relatively greater concentration of carbon than hydrogen compared to other lighter petroleum products which are converted into gas and lighter weight oils. Typically, the feed material is the residuum remaining after most of the petroleum crude has been converted into gas and oil in other parts of an oil refinery.

Figure 11:
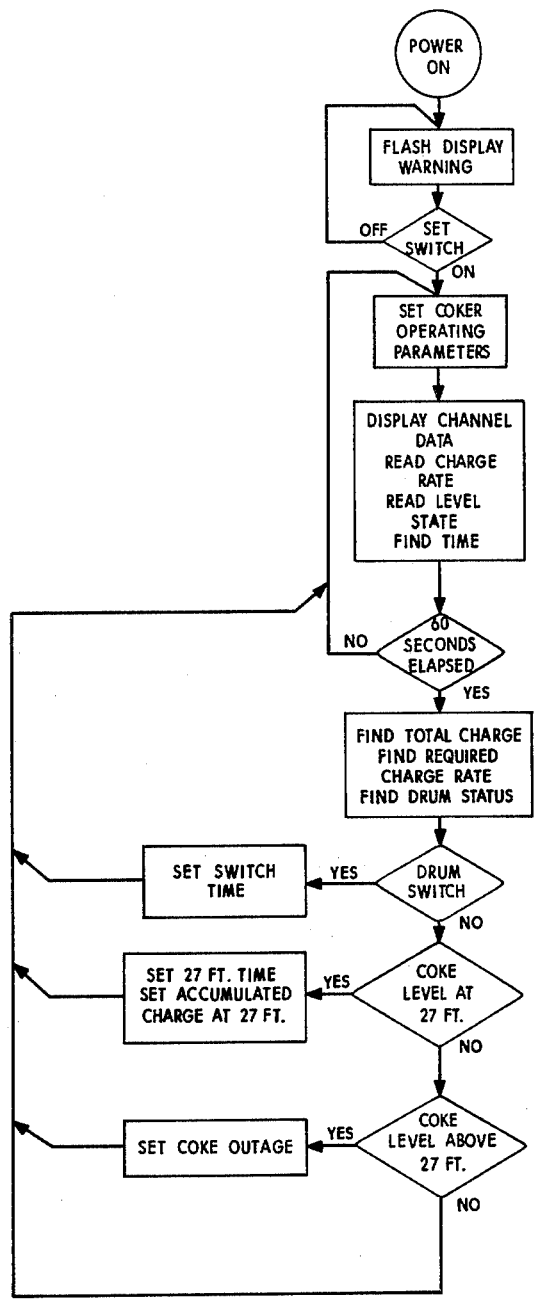
FIG. 11 is a master flow diagram showing the sequence of operation for predicting a proper feed rate.
Figure 12:
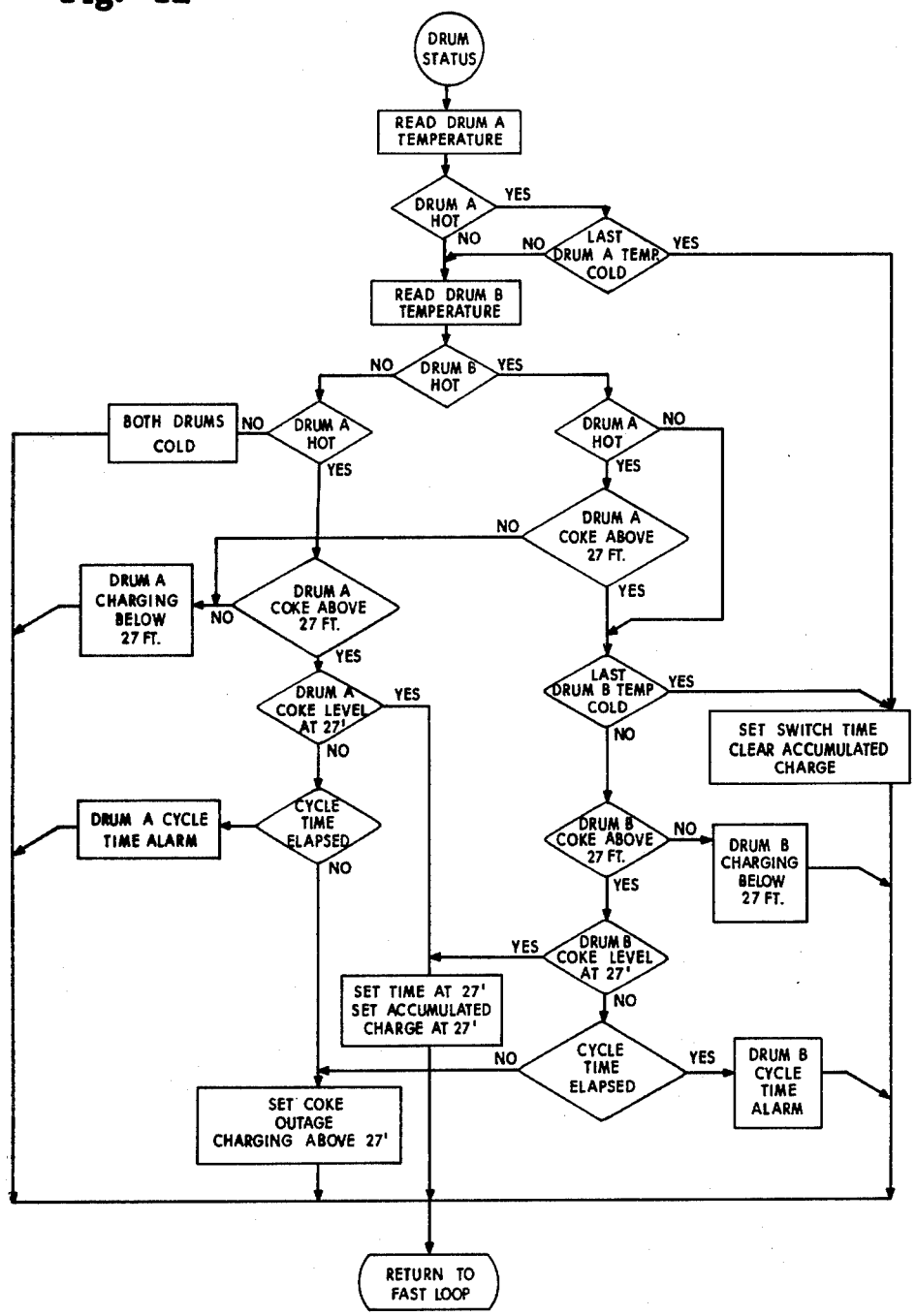
FIG. 12 is a flow diagram of a coking drum status routine designated in the flow diagram of FIG. 11.

After passing by flow meter 22, the petroleum enters a fractonation tower 24 which is a well-known vessel for separating heavier weighted materials from lighter materials. Conveniently, the lighter weight material moves to the upper portion of the tower 24 and returns through an opening therein to another part of the refinery for further product conversion. The heavier petroleum material, similar in composition to an asphalt or tar, moves from the bottom portion of the fractionator 24 through charge heater 26. Heater 26 increases the temperature of this heavy petroleum to approximately 950° F. As the petroleum continues to flow, a conventional thermocouple device 28 senses the temperature A at the inlet of a first coke drum 30. As illustrated in FIGS. 11 and 12, a process control unit 32 continually monitors temperature A even when the heavy petroleum is not being inputted to coke drum 30 but when temperature A is greater than 750° F. The thermocouple 28 then provides an indication to process control unit 32 that it now senses a temperature greater than 750° F.

Figure 3:
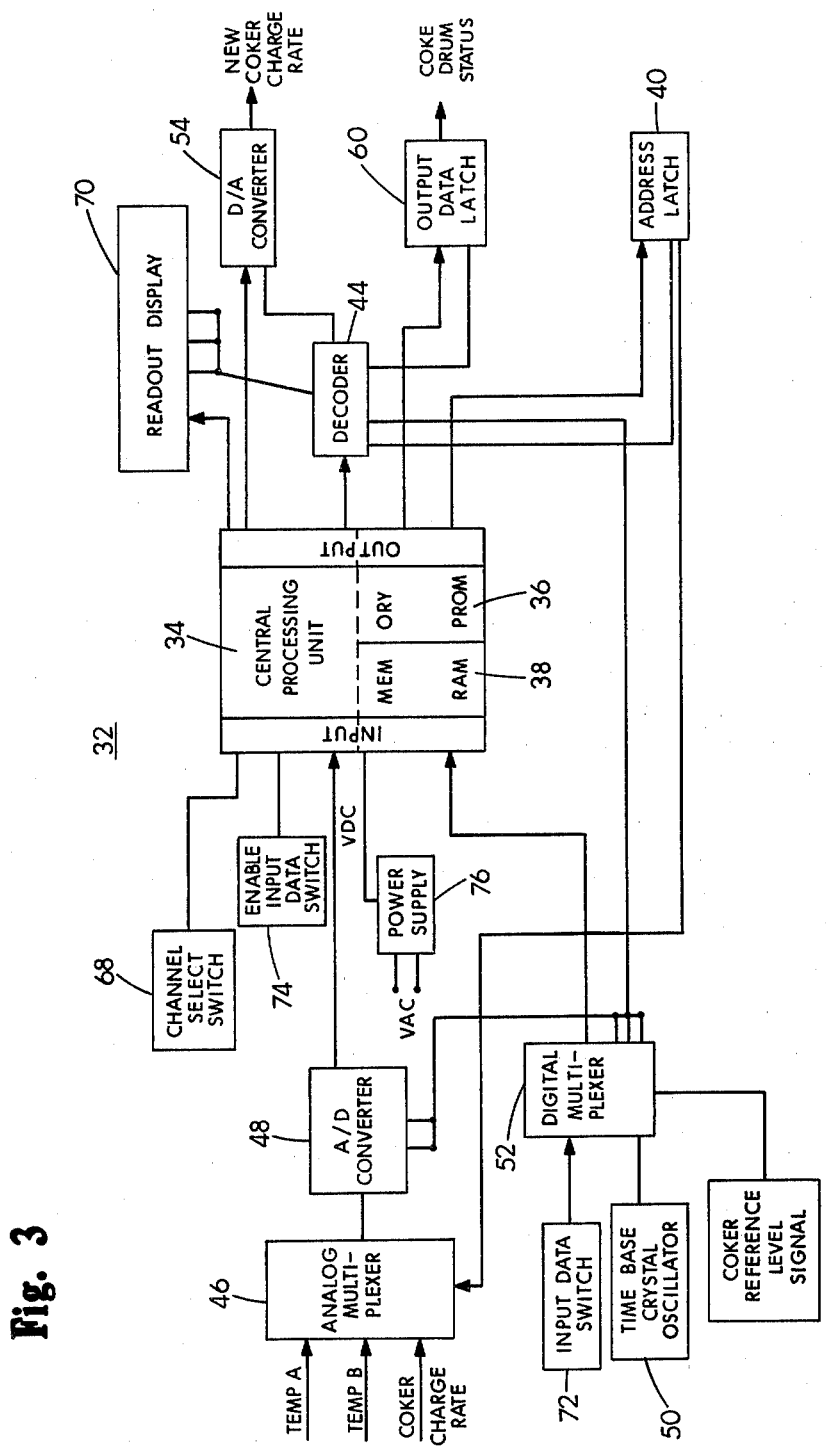
FIG. 3 is a block diagram of the parts of the process control unit.

As best illustrated in FIG. 3, process control unit 32 includes a central processing unit 34 type 4040 available from Intel Incorporated. Conventional PROM (programmable read only memories) 36 and RAM (random access memories) 38 units provide storage locations for the programmed sequence of operation and coking system parameters or constants necessary for the monitoring, predicting, and controlling operation to be described later in greater detail.

Figure 4:
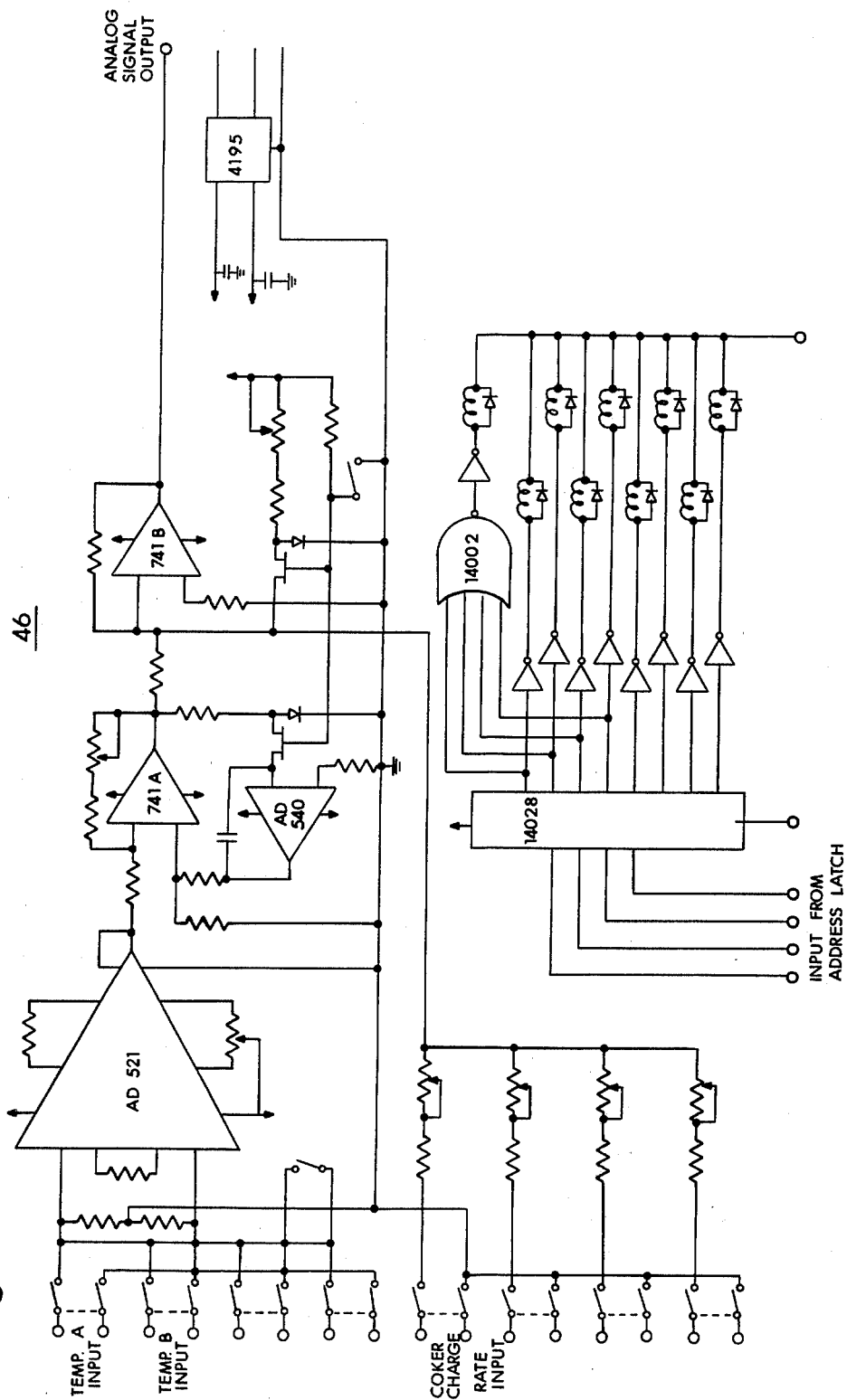
FIG. 4 is a diagram of the analog multiplexer.
Figure 7:
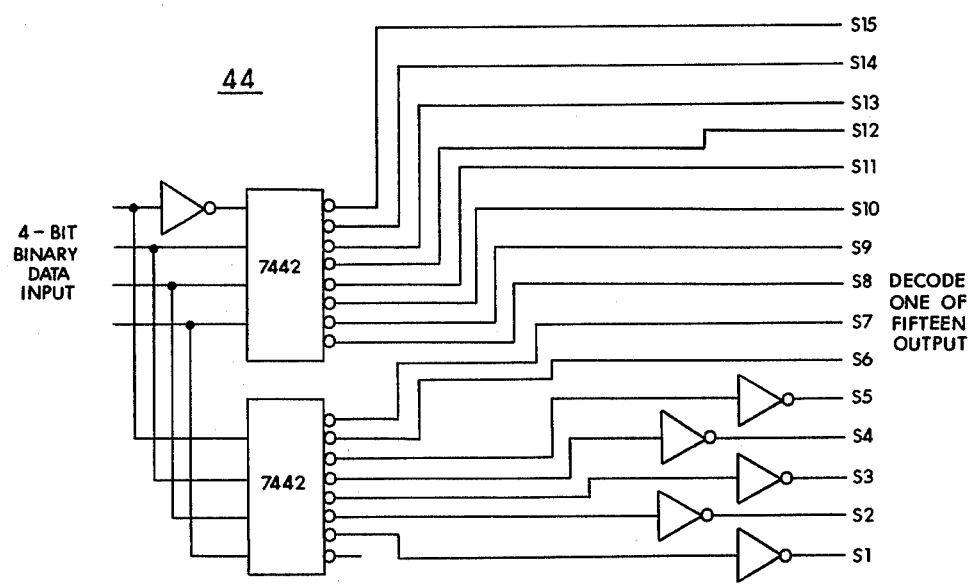
FIG. 7 is a diagram of the decoder logic.
Figure 8:
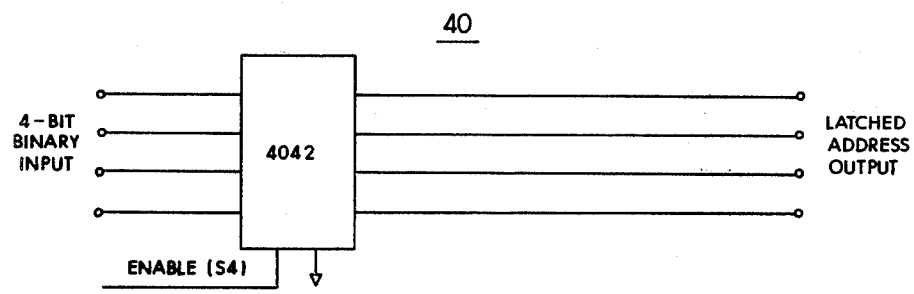
FIG. 8 is a diagram of the address latch.

Process control unit 32 further includes an address latch 40 to which microprocesser 34 sequentially sends binary information which indicates that one of three coking system parameters is to be checked. Address latch 40, as illustrated in FIG. 8, is a well-known circuit for holding or latching binary information at its output when the input signal is no longer present. The three coking system parameters which are sequentially monitored include temperature A of coke drum 30, temperature B of a second coke drum 42, and the charge rate of petroleum (CCR) delivered to fractionator 24. Thus, the programmed processer 34 sends, in turn, binary information to address latch 40 indicating that temperature A of coke drum 30 is to be checked. This information is held in address latch 40 until an enable signal (S4) from decoder 44 is present. Decoder 44 is also a conventional circuit, as illustrated in FIG. 7, to which is inputted four bits of binary information from processor 34 and which decodes this information to provide one of fifteen possible enable signals. The programmed processing unit 34 then timely sends binary information indicating that a designated one of the fifteen possible enable signals is to be used to strobe address latch 40. Once this decoder signal enables address latch 40, binary information indicating that one of the three coking system parameters is to be monitored is sent to analog multiplexer 46. Analog multiplexer 46 is a conventional circuit using typical semi-conductor devices and well known to one skilled in the art for selecting and amplifying one of a number of inputted analog signals which correspond to a value of a particular system parameter. In a particular embodiment of this invention, FIG. 4 illustrates a circuit arrangement for multiplexing analog signals, including the providing of a zero analog reference so that the processing unit 34 is not required to adjust the binary information to reflect an analog signal offset from a zero reference.

Figure 5:
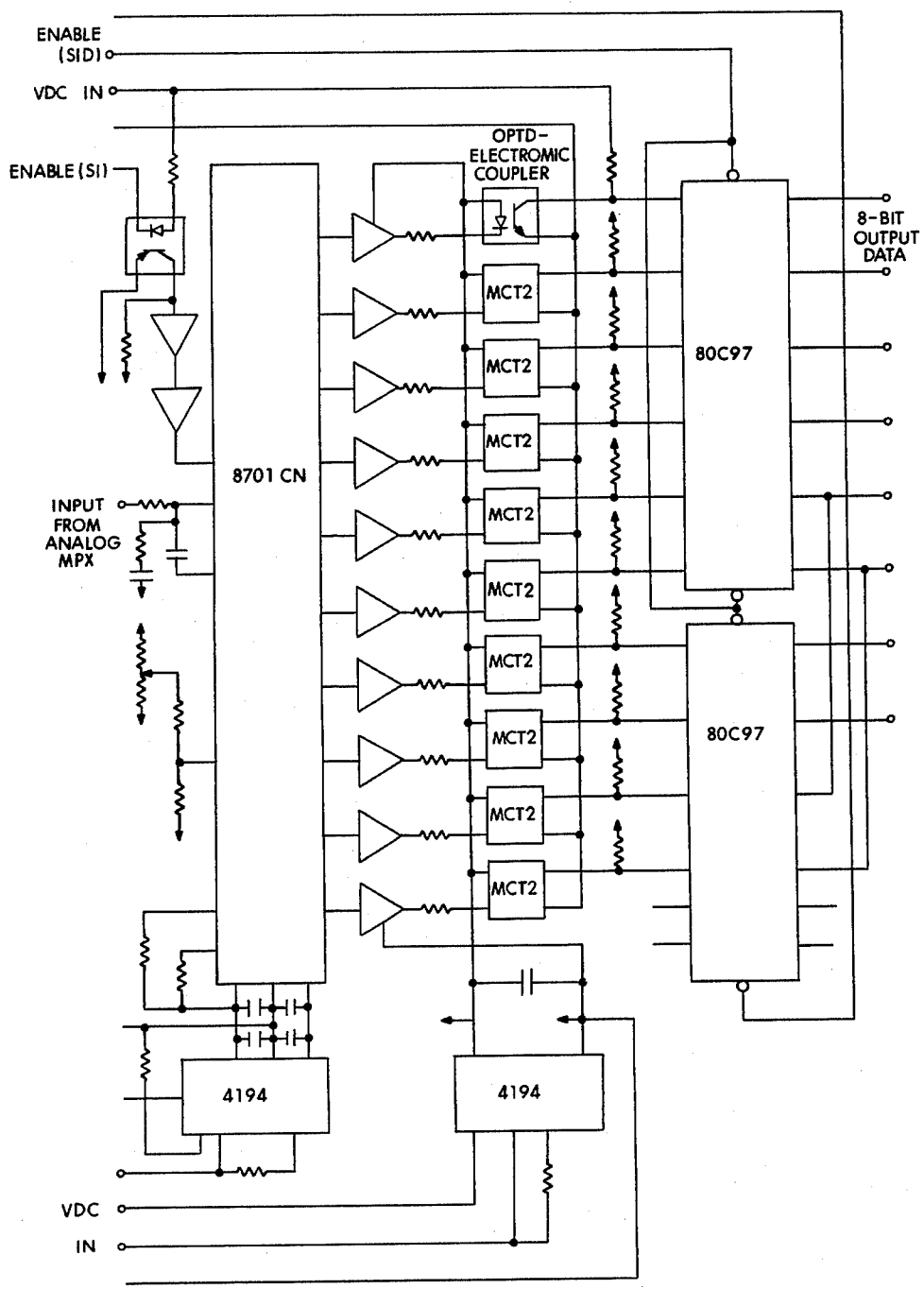
FIG. 5 is a diagram of the analog-to-digital converter.
Figure 6:
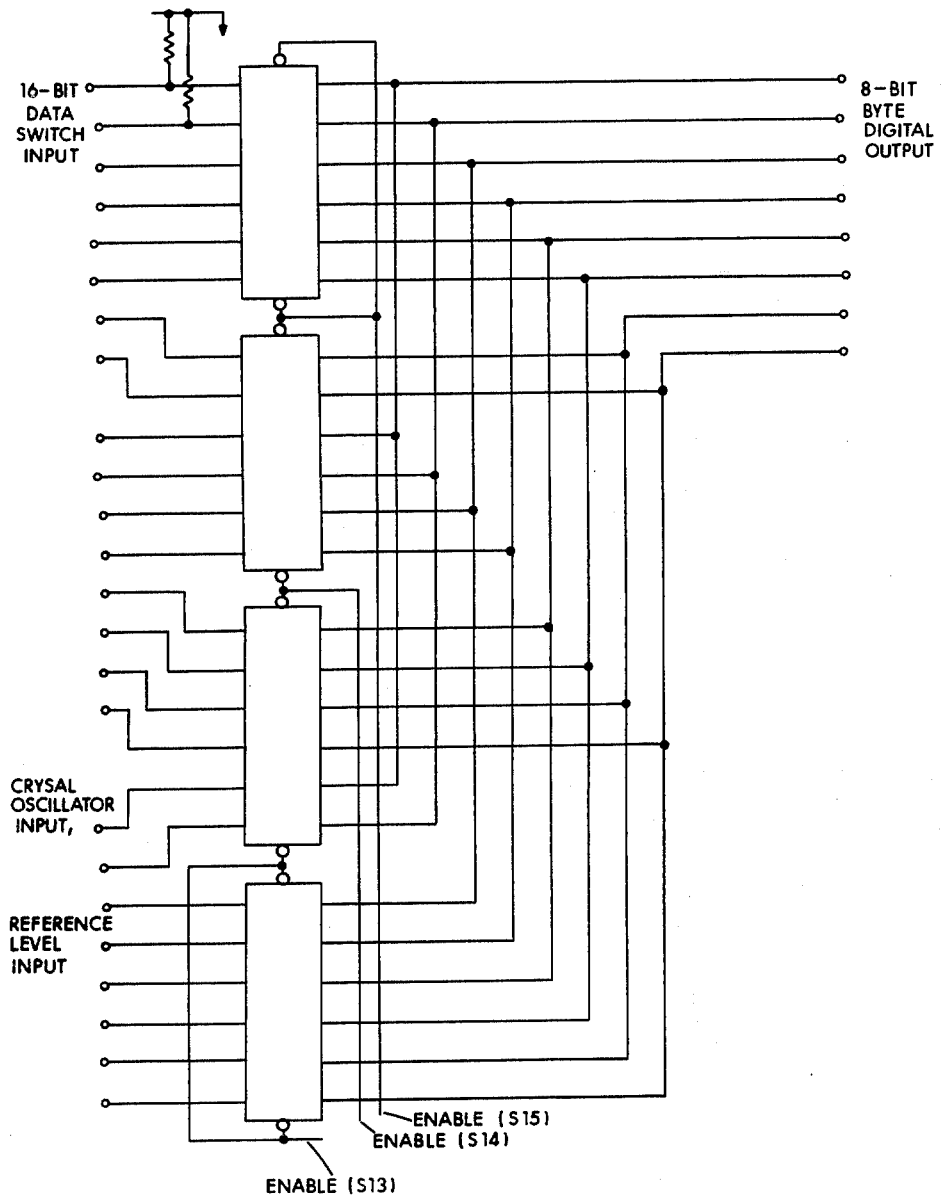
FIG. 6 is a diagram of the digital multiplexer.

When binary information, indicating that temperature A is to be checked, is inputted to the analog multiplexer 46 the relay in analog multiplexer 46 operably connected to this binary information is energized thereby closing the appropriate input switch. The thermocouple signal is then applied to analog multiplexer 46 and amplified therein. The temperature A analog signal is outputted to the input of an analog-to-digital (A/D) converter 48. The A/D converter is also a conventional circuit well known to one skilled in the art for converting analog signals to digital signals. FIG. 5 shows a preferred circuit arrangement for converting analog to digital signals in which the analog signal is isolated from the corresponding digital information by means of an optoelectronic isolating coupler so that the processing unit 34 is not subject to undesirable electrical signals.

After the temperature A signal reaches the input of the A/D converter 48 and sufficient time has lapsed so that no transient signal is present, microprocesser 34 timely sends binary information to decoder 44 which decodes the information and sends a strobe (S1) to the A/D converter 48 to enable or permit entry of the temperature A analog signal. The analog signal is digitized and remains in the A/D converter 48 until processing unit 34 timely sends more binary information to decoder 44 which decodes this information as an enable signal (S10) to be inputted to the A/D converter so that this newly converted digitized data, which includes eight bits of binary information, is gated to processing unit 34. When heated petroleum is being fed into coke drum 30 the programmed microprocessor 34 check of this digital data indicates that temperature A is greater than 750° F. As shown by the routine illustrated in FIG. 12, microprocesser 34 therefore determines that temperature A is hot, greater than 750° F. If the previous check by the programmed processing unit 34 indicated that temperature A was cold, 750° F. or less, the microprocesser 34 sends a signal which stores in a memory location, designated as Channel 1, binary information representing the last switch time or the time of day when the petroleum first entered coke drum 30. At this time the microprocesser 34 also clears a Channel 7 memory storage location which represents in binary form the total volume of petroleum delivered during the last coking cycle when that cycle was monitored by process control unit 32.

Microprocessor 34 is programmed to monitor the status of temperature A at sixty second intervals, although other time intervals may be utilized after proper programming. The minimum check time interval is limited by the ability of microprocesser 34 to timely manage its other tasks. Time base crystal oscillator 50 provides the necessary clock input so that processing unit 34 counts the pulses outputted by crystal oscillator 50 to determine when sixty seconds has passed. Crystal oscillator 50 is a conventional crystal controlled oscillator circuit using a quartz crystal which provides a pulsed output once every second. This pulsed output is sent to a digital multiplexer 52, illustrated in FIG. 5, which is also a conventional circuit known to one skilled in the art for applying, after receiving an appropriate enabling signal, one of a number of bytes of digital information. The microprocessor 34 timely sends binary information to decoder 44 which interprets the information as an enable signal (S13) which is then sent to gate the eight bit byte of binary information, corresponding to the output of crystal oscillator 50, to the input of microprocessor 34. In addition to monitoring the passing of sixty seconds, processor 34 also uses the output of crystal oscillator 50 to update a time of day memory storage location, designated as Channel 0, which represents in binary form the current time of day.

Similar to the procedure by which temperature A is monitored programmed processing unit 34 also timely enables, through decoder 44 and address latch 40, the analog signal representing the charge or flow rate of petroleum being delivered to coke drum 30 into analog multiplexer 46. The digital output of A/D converter 48, which represents in binary form the flow rate of the petroleum, is subsequently received by microprocessor 34. This digitized data is stored by microprocessor 34 in a Channel 5 memory storage location which is updated each time the charge rate is monitored to reflect a current coker charge rate. If a count of sixty pulses is present from oscillator 50, microprocessor 34 also integrates the inputted charge rate so that the quantity or volume of the petroleum product delivered to coke drum 30 during the previous sixty seconds is determined. This calculated value is then stored in a memory location designated as Channel 7. This integration process continues every sixty seconds as the coke drum 30 is being filled with the heavy petroleum. Channel 7 storage location is also changed each time to reflect the total accumulated petroleum or charge delivered to coke drum 30.

At the end of each sixty-second interval, processing unit 34 also initiates its control function. To optimize production of coke in coke drum 30, the charge rate is often adjusted at the input of fractionation tower 24. The new or adjusted charge rate is predicted by the microprocessor 34 from previously calculated and monitored parameters. The new predicted charge rate is determined by a series of microprocessor calculations. The last coke drum switch time located in Channel 1 storage location is subtracted from the current time binary representation located in Channel 0 memory location. This result provides the accumulated amount of time since coke drum 30 began receiving the petroleum product. A Channel 3 memory storage location contains a binary representation of a preselected coking cycle time. At the completion of the coking cycle, coke drum 30 will be filled to a preestablished level with coke. Consequently, programmed processing unit 34 subtracts the result, obtained by subtracting the data in Channel 1 from the data stored in Channel 0, from the data stored in Channel 3 to determine the amount of time remaining in the coking cycle. The binary information contained in Channel 3 may be initially received therein by means of a manual operation to be more fully explained later. The time period of the coking cycle depends primarily on the ability of charge heater 26 to properly heat the heavy petroleum product. The coking cycle is preferably between twenty and twenty-four hours to insure a full coke drum with other variables present such as type of feed stock and the limitations of heat input and operations scheduling.

A channel 8 memory storage location is also accessed by processing unit 34. Channel 8 contains data representing the accumulated charge or amount of petroleum delivered to a coke drum when the coke produced reached a reference coke drum level. In one embodiment, this drum reference level is preestablished such that this level is reached after approximately 82% of the coking cycle is completed or after 82% of the coking drum is filled with coke. As with Channel 3, the information contained in Channel 8 may be manually set therein. Channel 8 data represents the accumulated charge at the 82% coke drum level from the previous coking cycle. Under normal operating conditions the documented charge is set in Channel 8 by the processor 34 when the reference level is reached.

The microprocessor 34 then determines the total quantity of heavy petroleum to be delivered to coke drum 30, based on the Channel 8 data, so that the drum will be filled with coke at the end of the coking cycle. Channel 7 memory location is also accessed by processor unit 34 so that the binary information contained in Channel 7 can be subtracted from the total quantity of petroleum expected to be delivered to coke drum 30. This result provides a predicted quantity or charge of petroleum yet to be fed to coke drum 30. Microprocessor 34 subsequently divides this predicted quantity by the time remaining in the coking cycle to determine a charge rate necessary to achieve the predicted charge.

The processing unit 34 then timely sends eight binary bits, which digitally represent the new charge rate, to the input of a digital-to-analog (D/A) converter 54. D/A converter 54 is well known to one skilled in the art and includes a circuit 56 similar in function to decoder 44 to which microprocessor 34 sequentially applies binary information. One of the bytes of binary information sent indicates that the digital data representing the new charge rate is now to be converted into an analog signal. This conversion is initiated after microprocessor 34 has also sent a strobe signal through decoder 44 which enables the digital input then present at the input into D/A converter 54. The resulting analog signal may then be returned to the coking system to control in a conventional manner the opening and closing of flow control valve 58 which thereby increases or decreases the flow rate of petroleum into fractionation tower 24 in accordance with the predicted charge rate.

The programmed processing unit 34 also sequentially outputs binary data indicating whether the coke produced in coke drum 30 has exceeded the preestablished reference level based on the predicted quantity of petroleum delivered at that time. This data is sent to output data latch 60. Microprocessor 34 also timely enables output data latch 60 thereby gating the binary information present at the input. If the coke produced in coke drum 30 is below the reference point level, an indication of such is provided by a first light-emitting diode (LED).

Figure 9:
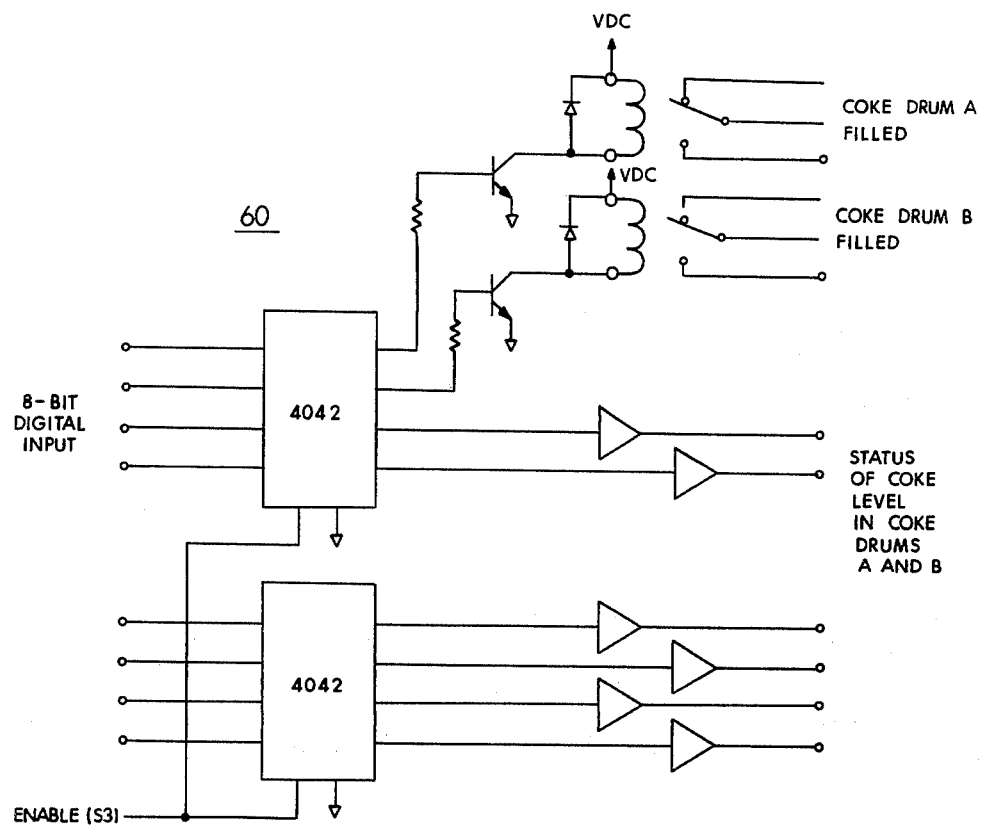
FIG. 9 is a diagram of the output data latch.
Figure 10:
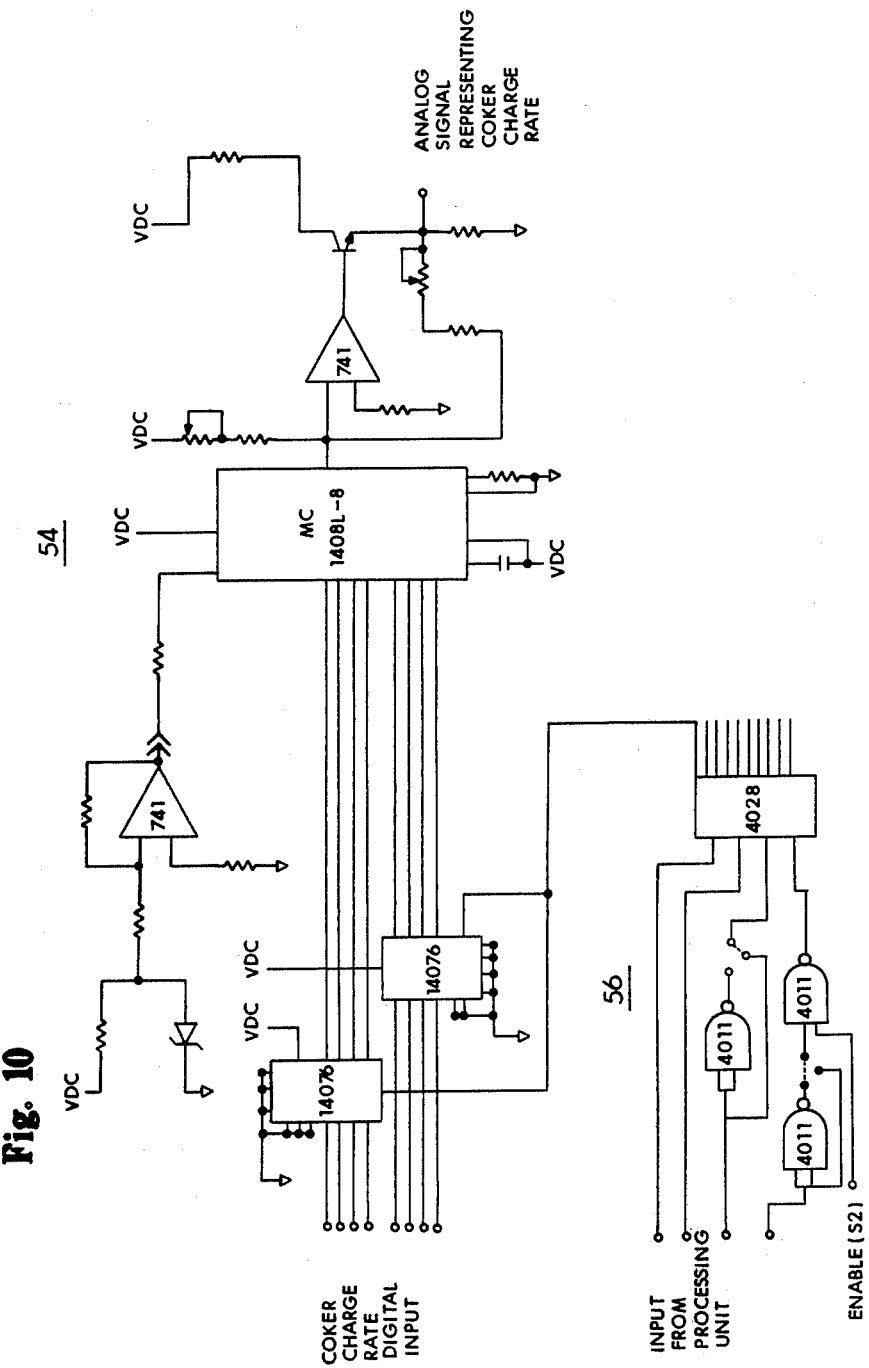
FIG. 10 is a diagram of the digital-to-analog converter.

Alternatively, if coke drum 30 is filled with coke above the reference point level, an indication of such is provided by a second light emitting diode (LED). Output data latch 60, as illustrated in FIG. 9, is a conventional circuit known to those skilled in the art.

Similar to the repetitive status check of temperature A by processing unit 34, a charge rate is predicted every sixty seconds, based on the present integrated accumulated charge to coke drum 30. The above-described programmed process continues until the coke produced in coke drum 30 reaches the coke drum reference level. As noted previously, this reference level represents the fact that approximately 83% of the coking cycle for coke drum 30 is completed. The reference level is also defined by the distance in feet from the top of the drum. In the particular embodiment which utilizes a reference level of 83% coking cycle completion, the coke produced in coke drum 30 at the 83% completion time is approximately twenty-seven feet from the top of the drum. Once the coke reaches the twenty-seven foot reference level, a signal indicating such is applied to process control unit 32.

The sensing that the coke produced has reached the reference or twenty-seven foot level is accomplished by a radioactive Cobalt 60 source which is positioned at the tip of a probe inserted into coke drum 30. As the coke approaches the twenty-seven foot mark, the signal from the radioactive source becomes more attenuated. At a certain level of attenuation, the produced coke is known to have reached the reference level. This particular attenuated level detector signal is sensed by level detector and amplifier 62, including conventional voltage comparator circuitry for determining that the voltage level sensed corresponds to a coke level at the twenty-seven foot mark, and further includes Geiger-Mueller tubes which eliminate the effects of stray signals and transmit strong high voltage signals to a conventional impulse receiver (not shown). This digital output from the impulse receiver indicating that the twenty-seven foot level has been reached is subsequently applied to digital multiplexer 52. As illustrated in FIGS. 11 and 12, the programmed processor 34 sequentially monitors whether the reference level has been reached by properly strobing digital multiplexer 52. After receiving binary information indicating that the twenty-seven foot level has been reached, microprocessor 34 initiates a particular set of programmed tasks. A Channel 2 memory storage location receives the time of day when this reference level was reached. A second LED indicating that the reference level was passed will light as a result of an appropriate output signal at output data latch 60 inputted by microprocessor 34. The first LED, indicating that the coke produced was below the twenty-seven foot mark, will no longer light. The binary information stored in Channel 8 will change to represent the new accumulated charge at a level of twenty-seven feet in coke drum 30. A Channel 4 memory storage location which contains binary data representing the total quantity or outage of coke produced during the previous coking cycle is updated to reflect the quantity of coke produced during the present coking cycle of coke drum 30. This outage value is then changed every 60 seconds until the completion of this particular coking cycle. After the twenty-seven foot mark has been exceeded for a particular coking cycle, the programmed processor 34 will then use the new accumulated charge stored in Channel 8 to predict an optimal flow rate for filling coke drum 30.

It can be appreciated that the reference level can also be placed at other points in coke drum 30 rather than the twenty-seven foot level. In addition, it is at least theoretically possible to place radioactive detecting sources at a number of coke drum levels. This would provide a capability of more accurately predicting the volume of coke produced from the petroleum delivered to that coke drum level. However, this would require additional radioactive sources inserted in coke drum 30, which would pose a greater safety hazard to coke system operating personnel.

Figure 2:
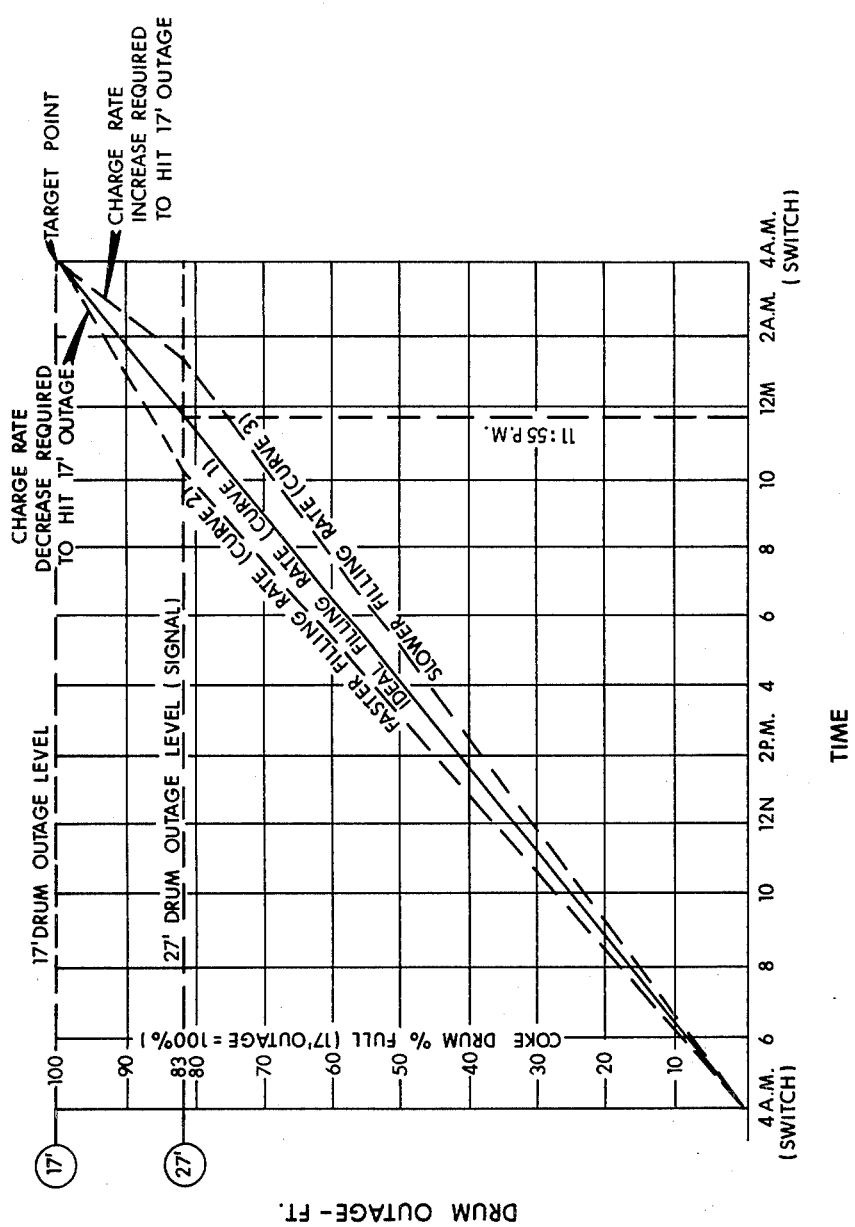
FIG. 2 is a graph showing a plot of coking drum output versus coking cycle time for three different drum filling rates.

As illustrated in FIG. 2, if the predicted quantity of petroleum to be delivered coincides with the actual quantity of petroleum needed to fill coking drum 30 with coke at the reference level, then curve 1 indicates that the charge rate should remain the same until 100% of coke drum 30 is filled or approximately ten additional feet of drum is filled. If the predicted quantity of petroleum to be delivered is greater than the actual quantity of petroleum needed to fill coking drum 30, then curve 2 indicates that the charge rate must decrease in order to meet the preestablished capacity level. Similarly, if the predicted quantity of petroleum to be delivered is less than the actual quantity of petroleum needed to fill coking drum 30, then curve 3 indicates that the charge rate should increase in order to meet the preestablished capacity level.

At the completion of the coking cycle, which in one embodiment is 24 hours from the last switch time, microprocessor 34 timely sends a signal to output data latch 60 to energize a relay which closes a switch and sends an alarm indicating that coke drum 30 is filled to capacity with coke. An operator then manually closes a first outlet of valve 64 which prevents the flow of petroleum to coke drum 30 and opens a second outlet of valve 64 to permit the flow of heavy petroleum to coke drum 42. As with coking drum 30, process control unit 32 continually monitors the status of Temperature B even when the heavy petroleum is not being inputted. The same process, then, previously described in connection with coking drum 30 is followed with regard to coking drum 42. The use of two coke drums permits removal of coke formed in a first drum while the second drum is being filled with the heated petroleum.

In addition to the units described above, process control unit 32 further includes a channel select switch 68. This is a conventional circuit which includes one push activated switch operably connected to each of the aforementioned Channel storage locations. Manual operation of a particular channel switch gates the binary information associated with that channel into a read out display 70 with the application of three separate enable signals as one enable signal gates an eight bit byte of binary information. The binary data is converted to a decimal digital display by conventional means known to those skilled in the art. The read out display 70 also includes the decimal representation of the particular channel number which was manually selected.

Process control unit 32 also includes input data switch 72 and input enable switch 74. Input data switch 72 comprises four conventional rotary switches which can be individually selected for setting a decimal input therein. Data switch 72 includes conventional circuitry to convert each of the decimal inputs to binary coded decimal (BCD) which is applied in a pair of eight bit bytes to the input of digital multiplexer 52. Upon selection of one of the nine channels at channel select switch 68 and the activation of input data enable switch 74, digital multiplexer outputs its digital data to microprocessor 34 with the application of the appropriate enable signals. The processing unit 34 stores the inputted data in the channel memory location corresponding to the selected channel switch. This storing capability permits entry of parameters required by the processor in predicting the charge rate. For example, Channel 3 which represents the cycle time for one coke drum, could be manually set for the desired period of time through the above described procedure.

A power supply 76 for the process control unit 32 includes an input for receiving 110 VAC at 60 HZ. Appropriate VDC outputs are generated using standard diode bridges and solid state regulators.

From the foregoing, the advantages of this invention are readily apparent. A process control unit in combination with a coking system has been provided which optimizes the production of coke formed in a conventional coke drum during each coking cycle. Operator error is significantly minimized thereby greatly reducing the possibility of an unscheduled coke production shut down.

This invention has been described in detail with particular reference to the preferred embodiments thereof, but it will be understood that variations and modifications can be effected within the spirit and scope of the invention.

We claim:

1. A system for producing a coke product from a petroleum product in combination with a process control unit for automatically predicting an optimal flow rate of petroleum into the system, said combination comprising:

a coking drum for forming a coke product from the petroleum and having a preestablished coking drum level;

measuring means for producing a first signal representative of measuring the flow rate of the petroleum product as it flows into said coking drum;

analog-to-digital converter means for producing binary signal information corresponding to said first signal;

integrating means for computing an incremental quantity of petroleum delivered to said coking drum from said binary signal information representing said flow rate;

accumulator means for receiving each incremental quantity of petroleum delivered and storing a totalized quantity thereof;

storage means for receiving predetermined coking system parameters;

means for predicting an optimal flow rate of petroleum using said totalized quantity stored in said accumulator means and said predetermined coking system parameters so that an optimal quantity of coke is produced in said coking drum;

first output means responsive to said predicting means to produce a data output signal representing said optimal flow rate of petroleum;

digital-to-analog converter means for producing a first analog signal corresponding to said optimal flow rate; and flow rate control means responsive to said digital-to-analog converter means for adjusting the flow rate of petroleum so that the petroleum is delivered to said coking drum at said optimal flow rate.

2. The combination, as claimed in claim 1, including:

sensing means for outputting a second signal representative of the temperature of the petroleum as it flows into said coking drum;

means for monitoring said second signal; and second output means for responding to the sensing of a preestablished petroleum temperature by resetting said accumulator means to zero.

3. The combination, as claimed in claim 1, wherein:

said storage means includes a first channel storage location having binary information corresponding to the quantity of petroleum to be delivered to the coking drum so that the coke produced therein is at said preestablished reference level.

4. The combination, as claimed in claim 3, including:

means for detecting the coke produced in said coking drum at said preestablished coking drum level;

means for providing a third signal indicating that the coke produced in said coking drum is at said preestablished coking drum level;

means for checking for the presence of said third signal; and third output means responsive to said third signal for updating the binary information contained in said first channel storage location so that the updated first channel binary information is subsequently used by said predicting means in determining an optimal flow rate of petroleum to said coking drum.

5. The combination, as claimed in claim 1, including:

a processing unit having a programmed sequence of operation; and a clock signal source inputting clock signals at a predetermined rate to said processing unit, wherein said processing unit counts the number of clock signals received and after counting a preselected number of counts, initiates said programmed sequence of operation.

6. The combination, as claimed in claim 5, wherein:

said storage means includes a plurality of channel storage locations having a fourth output means.

7. The combination, as claimed in claim 5, wherein:

said fourth output means includes a numerical read out display means.

8. The combination, as claimed in claim 6, including:

channel switch means for selectively displaying a read out corresponding to one of said channel storage locations.

9. The combination, as claimed in claim 7, including:

input data switch means for inputting numerical data into a preselected channel storage location so that coking system parameters are stored for subsequent use by said processing unit.

10. A method for automatically predicting an optimal flow rate of petroleum to a coking drum during a coking cycle using a digital processing unit, comprising the steps of:

establishing a reference level in the coking drum;

inputting petroleum to the coking drum;

monitoring the rate of flow of petroleum into the coking drum;

integrating the rate of flow of petroleum to the coking drum to determine the quantity of petroleum inputted;

detecting the presence of coke at said established reference level;

deriving automatically the total quantity of petroleum inputted to the coking drum at said established reference level; and predicting automatically a petroleum flow rate capable of filling the coking drum to a desired capacity at the completion of the coking cycle.

11. The method of claim 10 including the further step of:

controlling the flow rate of petroleum into the coking drum to reflect said predicted rate.

12. A method for automatically predicting an optimal flow rate of petroleum to a coking drum during a coking cycle using a digital processing unit, comprising the steps of:

a. establishing a reference level and a capacity level in the coking drum;

b. assigning at the beginning of the coking cycle a quantity of petroleum to be inputted to the coking drum so that coke produced therefrom will be at said reference level;

c. inputting petroleum to the coking drum;

d. monitoring the rate of flow of petroleum into the coking drum;

e. integrating the rate of flow of petroleum to the coking drum to determine the incremental quantity of petroleum delivered;

f. determining the time remaining in the coking cycle;

g. making a first prediction of an optimal petroleum flow rate that will fill the coking drum to said capacity level at the completion of the coking cycle;

h. altering the flow rate of petroleum to reflect said first predicted flow rate;

i. repeating steps d through h until said established reference level is reached;

j. updating the quantity of petroleum to be inputted to the coking drum so that coke produced therefrom will be at said reference level; and k. making a second prediction of an optimal petroleum flow rate that will fill the coking drum to said capacity level at the completion of the coking cycle.

13. A method for predicting an optimal flow rate of petroleum into a coking drum during a coking cycle using a digital processing unit, comprising the steps of:

establishing a reference level in the coking drum;

inputting petroleum to the coking drum;

detecting the presence of coke at said established reference level;

deriving automatically the total quantity of petroleum inputted to the coking drum at said established reference level; and predicting automatically a petroleum flow rate for filling the coking drum to a desired capacity at the end of the coking cycle.

* * * * *